Patented Mar. 29, 1932

1,851,097

UNITED STATES PATENT OFFICE

WINFRID HENTRICH AND MAX HARDTMANN, OF WIESDORF-ON-THE-RHINE, RUDOLF KNOCHE, OF LEVERKUSEN-ON-THE-RHINE, AND RICHARD STÜSSER, OF COLOGNE-DEUTZ, GERMANY, ASSIGNORS TO GENERAL ANILINE WORKS, INC., OF NEW YORK, N. Y., A CORPORATION OF DELAWARE

NEW AZO DYESTUFFS

No Drawing. Application filed February 10, 1928, Serial No. 253,522, and in Germany February 21, 1927.

The present invention relates to new disazo dyestuffs; more particularly it relates to dyestuffs of the probable general formula:

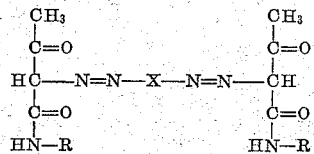

wherein X stands for a residue of the group consisting of diphenyl, diphenylurea and diphenylthiourea, each of the phenyl nuclei of the residue bearing a carboxylic acid group in ortho-position to the azo group, and the R's stand for sulfonated aromatic nuclei of the benzene and naphthalene series which may be further substituted by O-alkyl or halogen.

Our new dyestuffs are obtainable by coupling two molecules of a sulfonic acid of an aceto acet arylide of the general formula

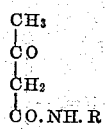

wherein R stands for a sulfonated aromatic nucleus of the benzene or naphthalene series which may be otherwise substituted with a tetrazo compound of such a diamino diphenyl as contains carboxylic acid groups in the ortho-position to the azo groups. The new substantive disazo dyestuffs thus obtained exhibit, in spite of the presence of more than one sulfonic acid group, very good solubility properties besides an excellent affinity for vegetable fibre, particularly cotton and artificial silk. It is to be understood that tetrazo compounds of higher molecular amines as for instance 4.4'-tetrazo-1.1'-diphenyl-3.3'-dicarboxylic acid or the tetrazo compound of 4.4'-diamino-1.1'-diphenyl-urea 3.3'-dicarboxylic acid etc. are included in the invention.

Obviously the disazo dyestuffs obtainable from compounds of the latter type can be produced indirectly instead of starting from the tetrazo compounds of the diamines, having the carboxylic groups in the ortho-position to the amino groups and coupling with the sulfonic acids of the aceto acet arylides: viz. by the subsequent linking up of the two monoazo dyestuffs obtainable from the diazo compound of an amine containing a carboxylic group in the ortho position to the amino group and a sulfonic acid of an aceto acet arylide.

The dyestuffs thus obtained are greenish yellow to orange compounds, easily soluble in water, difficultly soluble in the usual organic solvents. Their solution in sulfuric acid is yellow.

On dyeing these substantive azo dyestuffs on the vegetable fibre, particularly on cotton and artificial silk, clear yellow, orange and brown shades are obtainable possessing a satisfactory fastness to light. When treating the dyeings on the fibre in the customary manner with metal salts, dyeings very fast to light and especially fast to washing are obtained.

The following examples will illustrate our invention without limiting it thereto:—

*Example 1.*—The tetrazo compound from 330 parts by weight of 4.4'-diamino diphenyl urea-3.3'-dicarboxylic acid, prepared with the customary precautions, is added to an aqueous solution, rendered alkaline with sodium carbonate, of 690 parts by weight of the sodium sulfonate of aceto acet-ortho-chloranilide. When the coupling is complete, the yellow dyestuff is salted out and is obtained in the crystalline form. It dyes viscose pure yellow, cotton greenish-yellow shades. When the dyeings on cotton are subsequently treated with copper salts, very fast yellow shades are obtained.

*Example 2.*—The tetrazo compound from 272 parts by weight of 4.4'-diamino diphenyl-3.3'-dicarboxylic acid is added to an aqueous solution, rendered alkaline with sodium carbonate, of 938 parts by weight of the sodium disulfonate of acetoacet-1-naphthylamide. The working up is effected as usual. The dyestuff dyes viscose orange yellow, cotton yellow shades. When the dyeings on cotton are subsequently treated with copper salts, brownish-yellow shades are obtained.

*Example 3.*—The tetrazo compound from 330 parts by weight of 4.4′-diamino diphenyl urea-3.3′-dicarboxylic acid, prepared with the customary precautions, is added to an aqueous solution, rendered alkaline with sodium carbonate, of 574 parts by weight of the sulfonic acid of aceto-acet-ortho-anisidide (m.-p. 143° C.) When the coupling is complete, the yellow dyestuff having in the free state the following formula:

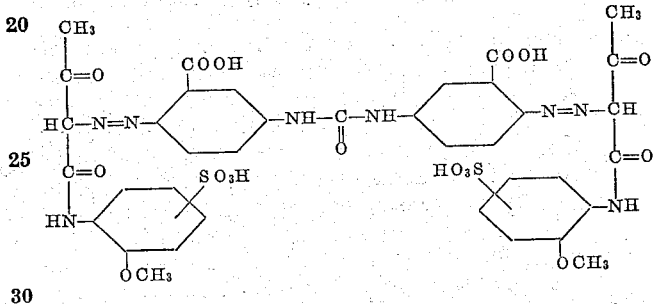

is salted out. It dyes viscose and cotton a beautiful golden yellow shade. On subsequent treatment of the dyed cotton with copper salts, clear yellow shades of good fastness result.

On treatment with stannous chloride in acid solution, the dyestuff yields 1 molecule of 4.4′ diamino-diphenyl-urea-3.3′-dicarboxylic acid and two molecules of a compound of the probable formula.

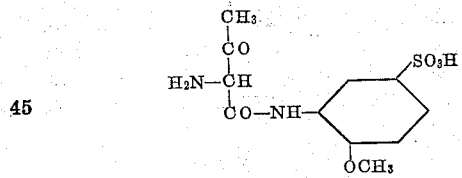

which is immediately changed into another product, the constitution of which is as yet unknown.

*Example 4.*—182 parts by weight of 5-nitro-2-amino-benzoic acid are diazotized and coupled with an aqueous solution, rendered alkaline with sodium carbonate, of 287 parts by weight of the sulfonic acid of aceto acet-ortho-anisidide (m.-p.-143° C.) The nitro group is then reduced with a slight excess of crystallized sodium sulfide and phosgene is then used to transform the monoazo compound into the symmetrical urea in the customary manner. The dyestuff is identical with that of Example 3.

If instead of phosgene, thiophosgene or carbon-disulfide are used, the corresponding symmetrical thio-urea is produced. The latter dyes cotton in yellowish brown shades, which on subsequent treatment with copper salts change to brown.

We claim:—

1. As new products the disazo dyestuffs of the probable general formula:

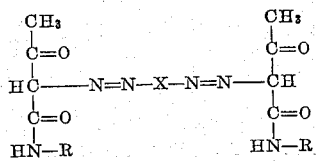

wherein X stands for a residue of the group consisting of diphenyl, diphenylurea and diphenylthiourea, each of the phenyl nuclei of the residue bearing a carboxylic acid group in ortho-position to the azo group, and the R's stand for sulfonated aromatic nuclei of the benzene and naphthalene series which may be further substituted by O-alkyl or halogen, said dyestuffs being greenish-yellow to orange powders easily soluble in water, soluble in strong sulfuric acid with a yellow coloration, dyeing the vegetable fibre, particularly cotton and artificial silk clear yellow, orange and brown shades.

2. As a new product the dyestuff of the probable formula

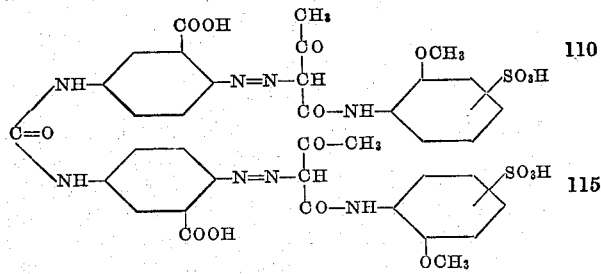

said dyestuffs being a reddish yellow powder easily soluble in water, soluble in strong sulfuric acid with a yellow coloration, exhibiting very good solubility properties besides an excellent affinity for vegetable fiber, particularly cotton and artificial silk, dyeing viscose and cotton beautiful golden yellow shades the latter changing to a clear yellow of good fastness on subsequent treatment with copper salts, and yielding on treatment with stannous chloride in acid solution 1 molecule of 4.4′-diamino-diphenyl-urea- 3.3'-dicarboxylic acid and two molecules of a compound of the probable formula:—

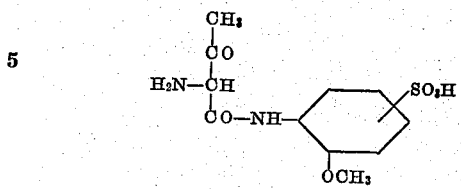

which is immediately changed into another product the constitution of which is as yet unknown.

3. As new products the disazo dyestuffs of the probable general formula:

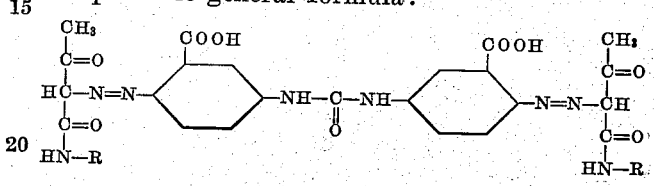

wherein R stands for a sulfonated aromatic nucleus of the benzene or naphthalene series which may be further substituted by O-alkyl or halogen with a tetrazo compound of such a diamino diphenyl as contains carboxylic acid groups in the ortho position to the azo groups, said dyestuffs being greenish-yellow to orange powders easily soluble in water, soluble in strong sulfuric acid with a yellow coloration, dyeing the vegetable fiber, particularly cotton and artificial silk, clear yellow, orange and brown shades.

In testimony whereof we have hereunto set our hands.

WINFRID HENTRICH.
MAX HARDTMANN.
RUDOLF KNOCHE.
RICHARD STÜSSER.